United States Patent [19]
Ghyczy

[11] Patent Number: 5,523,429
[45] Date of Patent: Jun. 4, 1996

[54] N-ACYLPHOSPHATIDYLETHANOLAMINES AS ANTI-OXIDANTS

[75] Inventor: Miklos Ghyczy, Cologne, Germany

[73] Assignee: Rhone-Poulenc Rorer-GmbH, Cologne, Germany

[21] Appl. No.: 199,144

[22] PCT Filed: Dec. 12, 1992

[86] PCT No.: PCT/EP92/02882

§ 371 Date: Feb. 25, 1994

§ 102(e) Date: Feb. 25, 1994

[87] PCT Pub. No.: WO93/12213

PCT Pub. Date: Jun. 24, 1993

[30] Foreign Application Priority Data

Dec. 18, 1991 [DE] Germany .......................... 41 41 842.5

[51] Int. Cl.$^6$ .................................................. C07C 51/50
[52] U.S. Cl. .................... 554/4; 554/5; 554/80; 252/397; 252/399; 252/400.2; 252/400.21
[58] Field of Search .................... 554/4, 5, 80; 252/397, 252/399, 400.2, 400.21

[56] References Cited

FOREIGN PATENT DOCUMENTS

| 0237880 | 9/1987 | European Pat. Off. . |
|---|---|---|
| 0245723 | 11/1987 | European Pat. Off. . |
| 2756866 | 6/1979 | Germany . |
| 2173183 | 7/1990 | Japan . |
| 8402867 | 4/1986 | Netherlands . |

OTHER PUBLICATIONS

"Role of Seed Phosphatides as Antioxidants for Ghee (Butter Fat)" by Iqbal S. Bhatia, Narinder Kaur & Pritam S. Sukhija, J.Sci.Fd Agric. 1978, 29, 747–752.

"Phospholipids plus Tocopherols Increase Soybean Oil Stability" by D. H. Hildebrand, JAOCS, vol. 61, No. 3 (Mar., 1984).

"Die antioxidativen Eigenschaften von Lecithin" by Von Alice Nasner, Fette Seifen Anstrichmittel, 87 Jahrgang, No. 12 (1985).

"Antioxygen & Peroxide Decomposition Properties of Antarctic Krill Lipids" by Jong–Ho Lee, K. Fujimoto & T. Kaneda, Bulletin of the Japanese Society of Scientific Fisheries, pp. 881–888 (1981).

"Peroxide–decomposing Activities of Antarctic Krill Lipids & Certain other Oils" by J. Lee, K. Fujimoto & T. Kaneda, Biol. Chem, pp. 2001–2007, (1983).

"The Antioxidant Effects of Phospholipids on Perilla Oil", by M. Kashima, JAOCS, vol. 68, No. 2, (Feb. 1991) pp. 119–121.

"Phase Behavior of Synthetic N–acylethanolamine Phospholipids", by J. L. Newman, D. I. Stiers, W. H. Anderson & H. H. O. Schmid, Chemistry and Physics of Lipids, 42 (1986) 249–260, Elsevier Scientific Publishers Ireland Ltd.

Masui, "Compositions containing unsaturated fatty acids and their stabilization", Chemical Abstracts, abstract of DE–3,419,796, 102:80747, vol. 102, #10, pp. 103, 1985.

*Primary Examiner*—José G. Dees
*Assistant Examiner*—Deborah D. Carr
*Attorney, Agent, or Firm*—Meltzer, Lippe, Goldstein, et al.

[57] ABSTRACT

A method of inhibiting oxidation of products containing unsaturated fatty acids and their derivatives comprises treating the unsaturated fatty acids and their derivatives with N-acylphosphatidylethanolamines. Preferred N-acylphosphatidylethanolamines are N-acetylphosphatidylethanolamine and N-oleoylphosphatidylethanolamine.

10 Claims, No Drawings

N-ACYLPHOSPHATIDYLETHANOLAMINES AS ANTI-OXIDANTS

This application is a 3.71 of PCT/EP92/02882 filed Dec. 12, 1992.

BACKGROUND OF THE INVENTION

The present invention relates to the use of N-Acylphosphatidylethanolamine as anti-oxidant for unsaturated fatty acids.

Unsaturated fatty acids are broadly used compounds. They can be found in free form or chemically bound, as in triglycerides, phospholipids and sphingolipids. They are found broadly in nature and are important constituents of the food. Bound to glycerol, as triglycerides, they are present in plant seeds as energy store and are isolated from them as important basic compound for human and animal nutrition. In the phospholipids the unsaturated fatty acids are connected with all cellular membranes. In free form they are the initial products for the biological synthesis of important active products in living species, like e.g. prostaglandins. In all types of incidence the chemically unchanged form is the prerequisite for the accomplishment of the function assigned to the unsaturated fatty acids.

The most serious change is the oxygenation of the double bond in the fatty acid, with as a consequence peroxide formation and a radical chain reaction, which leads to a cleavage of the fatty acids. These reactions nay be in full control, but can also be uncontrolled. Examples of controlled oxidation are the metabolism of nutrition as energy source, the immunological resistance against bacteria and parasites and the synthesis of mediators like prostaglandins.

The radicals which are formed at the uncontrolled radical chain reaction can not only react with fatty acids but also with proteins and nucleic acids. The reaction products lead to pathological changes in the organism.

The uncontrolled oxidation is inhibited by anti-oxidants, which are taken up with the food, or are synthesised in the organism. Deficient nutrition, pathological changes and the process of ageing can lead to a deficiency in anti-oxidants.

The oxidation of consumption fats is always unwanted and leads to products, which are toxicologically unsat and which make the nutrient unpalatable by changes in the taste. These changes can be inhibited by anti-oxidants and as much as possible by the exclusion of oxygen.

Due to the large presence in different biological systems and the great importance of unsaturated fatty acids, the properties of anti-oxidants for the protection of unsaturated fatty acids are subject to various conditions. Up to now none of the known anti-oxidants fulfils the majority of these conditions.

The most used natural anti-oxidants are α-tocopherol and β-carotene are on the one hand perfectly efficacious but unstable in the presence of oxygen and light. Also the heat stability which is important in the use of some foodstuffs like oils, is limited.

Furthermore there is a complicated isolation process or a synthesis which makes the product expensive.

Ascorbic acid has the disadvantage, that it is not soluble in oils and for that matter only effective in aqueous surroundings, so that it can inhibit the oxidation of fatty acids which are present in the fat phase only to a limited extent. A further disadvantage is the fact, that ascorbic acid can be an oxidative agent in combination with iron salts.

Furthermore synthetic phosphatides as well as phosphatides isolated from plant and animal fats and oils were investigated on their anti-oxidant properties against the autoxidation of fats and oils alone and in combination with additives.

The results obtained are however strongly contradictory.

For instance is the investigation of crude lecithin and its ethanol-soluble and ethanol-insoluble fractions described by A. Nasner in Fette, Seife, Anstrichmittel 12 (1985) pp. 477–481 to determine their anti-oxidative efficacy in storage tests with sunflower oil and lard. He found, that the anti-oxidative effects depend on the type of lecithin fraction used. The ethanol-soluble fraction of the soybean lecithin with the largest portion of phosphatidylethanolamine showed the best effects. The inhibition of the oxidation of lard with a content of a-tocopherol of less than 10 ppm is markedly greater than of sunflower oil which contains 500 ppm α-tocopherol.

According to Nasner a synergy between α-tocopherol and the phosphatides can be excluded, whilst phosphatides alone provide an anti-oxidative effect.

Comparable results are obtained by D. H. Hildebrand in JAOCS 61 (1984) pp. 552 ff. in an investigation to the anti-oxidative effects of phosphatidylcholine, phosphatidylinositol and phosphatidylethanolamine. He showed, that the oil stability increases upon addition of phosphatides alone and in combination with a-tocopherol.

A synergy between the phosphatides and α-tocopherol is assumed. The best effect shows phosphatidylethanolamine, which is also confirmed by I. S. Bhatia et al. in J. Sci. Fd. Agric. 79 (1978) pp. 77 ff.

Other investigations are in contrast with these investigations. J. H. Lee et al describe for instance in the Bulletin of the Japanese Society of Scientific Fisheries 47 (1981) pp. 881–883 the anti-oxidative effects of lipids of the Antarctic shrimp. In these investigations α-tocopherol was identified as the active substance, whereas only a synergistic effect was attributed to the phosphatides in respect to the improvement of the effects of α-tocopherol.

J. H. Lee et al in J. Biol. Chem. 47 (1983) pp. 2001 ff. investigated the anti-oxidative properties of phosphatide fractions from shrimp, egg yolk and soybeans and observed, that these fractions do not provide an anti-oxidative effect, but activate the decomposition of the peroxides formed by oxidation.

M. Kashima et al. in JAOCS 68 (1991) pp. 119 ff. also deny the anti-oxidative effect of phosphatides as phosphatidylcholine, phosphatidylethanolamine and phosphatidylserine. The anti-oxidative effects of these phosphatides were determined in tocopherol-free perila oil and the same oil with an increased content in tocopherol. It was observed, that the oxidative stability of the tocopherol-free perila oil was not improved by the addition of the phosphatides, whereas on the other hand the oxidation of the perila oil with the increased content in tocopherol was strongly suppressed by the addition of phosphatidylethanolamine and phosphatidylserine. This confirms earlier results, that phosphatides alone do not provide an anti-oxidative effect, but only increase the anti-oxidative effect of α-tocopherol due to a synergistic mechanism.

Other natural anti-oxidants are plant extracts. like for instance extracts from rosemary. The disadvantages of such products are the natural variations of their composition. They often contain dyes, have an unwanted taste and smell and are difficult to obtain.

Anti-oxidants not obtained from natural sources, like BHA, BHT, TBHQ and propyl gallate all contain a sterically hindered phenyl moiety and are, as all phenols in biological systems, reactive. Investigations in recent years have shown, that BHA may cause cancer at certain concentrations in different animal species. For that reason BHA-containing foodstuffs must be marked with the text "BHA may lead to cancer, unless certain concentrations are kept" in some countries. Also the increasing awareness of environmental problems in the population has led to a steady decline in the acceptance of unnatural products in foodstuffs.

SUMMARY OF THE INVENTION

The aim of the present invention was to provide a product, which inhibits or at least strongly reduces the oxidative decomposition of unsaturated fatty acids in free or bound form and does not show the disadvantages of the anti-oxidants presently in use.

This aim is reached by the use of N-acylphosphatidylethanolamine as anti-oxidant for products containing unsaturated fatty acids and their derivatives.

DETAILED DESCRIPTION OF THE INVENTION

N-acylphosphatidylethanolamines are known compounds, the occurrence in the nature of which was investigated in depth by J. L. Newman in Chem. Phys. Lipids 42 (1986) pp 249 ff. This type of product was found in micro-organisms, plants, tissue of vertebrates like e.g. the myocardium or the epidermis, as well as in amoebae and plant seedlings.

It was a surprise, especially in respect with the contrasting results of the investigations of related products to their anti-oxidative effect, that N-acylphosphatidylethanolamines can protect unsaturated fatty acids in free as well as in bound form against oxidative decomposition.

This product group furthermore provides several advantages in comparison with the anti-oxidants used up to now:

These compounds are present in humans, animal and plant organisms and are toxicologically safe.

They build barriers in the form of bilayers in analogy to biological membranes and are dispersible in water as well as soluble in lipid.

Their stability in the presence of oxygen and light is greater than that of α-tocopherol.

The N-acyl phosphatidylethanolamines used according to the invention can be synthesised according to DE-A-27 56 866 (U.S. Pat. No. 4,254,115) by the reaction of phosphatidylethanolamine with acid chlorides or acid anhydrides.

Chemically pure phosphatidylethanolamine can be isolated from ethanol insoluble soybean lecithin fractions, which are usually rich in phosphatidylethanolamine. Preparative chromatographic separation methods allow the production of pure products for the reaction with acid anhydrides.

Determination of the efficacy of N-acylphosphatidylethanolamines.

The oxidative decomposition of compounds containing unsaturated fatty acids goes according to different reaction mechanisms, whereby the oxidative agents may differ. To prove the efficacy of the N-acylphosphatidylethanolamines soybean N-acylphosphatidylethanolamine (NACPE), soybean N-acetylphosphatidylethanolamine (NATPE) and soybean-N-oleoylphosphatidylethanolamine (NOLPE) were investigated in four different test systems.

EXAMPLE 1

Synthesis of NOLPE 100 g chemically pure phosphatidylethanolamine was produced by a column-chromatographic separation of an alcohol-insoluble soybean lecithin fraction rich in phosphatidylethanolamine on silica gel with chloroform/methanol as eluent. The product is dissolved in 500 ml toluene and is reacted after the addition of 38 ml triethylamine with a solution of 41.2 g oleic acid chloride in 60 ml toluene under stirring. After stirring for one hour at room temperature the sedimented triethylamine chloride is filtered off and the solvent removed in vacuum at a bath temperature of 60° C. under nitrogen. The residue is N-Oleoylphosphatidylethanolamine in the form of a viscous brown oil.

Yield 115 g=96% of the theory.

Synthesis of NATPE

The synthesis of NATPE is performed analogously by the reaction of 100 g chemically pure phosphatidylethanolamine with 14 g acetic anhydride.

Yield 100.1 g=97% of the theory.

Synthesis of NACPE

The synthesis of NACPE is performed analogously by the reaction of chemically pure phosphatidylethanolamine with mixtures of fatty acid chlorides, which are gained by the chlorination of fatty acid mixtures from soybeans, palm oil or sunflower oil.

Oxidative agent 1: cumene hydroperoxide (CHP)
(A. Sevanian in Lipid Peroxidation (1988) pp. 84–99)

| Method 1: | |
|---|---|
| 100 umol/l | cumene hydroperoxide |
| 40 umol/l | FeCl$_2$ as oxidative agent and |
| 100 ug | substrate (for instance linoleic acid) | are dissolved in 2.5 ml water with 10 mmol/l tris buffer at pH 7.4.

The substances to be used according to the invention were added in increasing concentrations from 0.01 to 5% by weight relative to the substrate.

The control sample does not contain additives. After an incubation period of 1 h at 37° C. the change induced by the oxidative decomposition was determined.

| Method 2. | |
|---|---|
| 1 g | plant oil |
| 100 ul | cumene hydroperoxide (184 ul in 10 ml ethanol) |
| 10 ul | FeCl$_2$ (0,2 mmol/l) | are incubated for 1 h at 37° C.

This system is the most frequently used model to measure radical oxidations under controlled conditions in vitro.

Oxidative agent 2: UVA light irradiation
(K. J. Denis & T. Shibamoto: Lipids 25 (1090) pp. 460–464)

| Source: | fluorescent lamp Philips TL/10 |
|---|---|
| Radiation time: | 1 h |
| Quantity: | 100 ug substrate |

The substrate and the inventive anti-oxidants are dispersed in 2 ml water which leads to the formation of micelles with the fatty acids and the formation of liposomes with the phospholipids and the sample is irradiated.

This oxidation model is the model of choice for the light-induced radical reactions.

Oxidative agent 3: Lipoxygenase (LOG)
(H. Aochima; Anal. Biochem. 25 (1978) pp. 49–55)

A reaction sample contains in 3 ml of

| 0.1 mol/l potassium borate buffer pH 8.0: | |
|---|---|
| 1500 U/ml | soybean lipoxygenase type I (Sigma) |
| 100 ug | substrate |

Duration of incubation: 1 h at 37° C.

This reaction allows the evaluation of enzymatically induced peroxidations under controlled conditions.

Oxidative agent 4: superoxide (SPO)

(T. C. Pederson, S. D. Aust; Biochem. Biophys. Res. Comm. 52 (1973) pp. 1071–1078;

M. Tien, B. A. Svingen & S. D. Aust;

Federation Proceedings 40 (1981) pp. 179–182)

| Method: | |
|---|---|
| 0.33 mol/l | xanthine |
| 0.10 IU | xanthine oxidase |
| 0.10 mmol/l | $FeCl_3$ |
| 0.11 mmol/l | EDTA |
| 0.20 mmol/l | ADP |
| 100 ug | substrate | are suspended in 0.3 mmol/l NaCl solution and incubated for 1 h at 37° C.

This oxidation system allows the in vitro investigation of anti-oxidants, the mode of action of which is assumed to be at the peroxidation in the respiration cycle of cells.

The inventive substances were added in the following concentrations as % by weight relative to the substrate:

0% (control), 0.01%, 0.05%, 0.1%, 0.5%, 1%, 5%.

After termination of the incubation the degree of the oxidative decomposition is quantified according to the following criteria:

decreased concentration in linoleic acid (investigative method 1)

increase in malondialdehyde as main decomposition product of linoleic acid (investigative method 2).

Method of investigation 1.

Determination by gas chromatograph of the change in substrate concentration

The determination of the peroxidation is performed indirectly by the determination of the loss of linoleic acid. To make corrections for losses due to the sampling palmitic acid is added to the solution to be peroxidised and the quotient C16/C18 determined.

| Gas chromatograph conditions: |
|---|
| column DB-225, 25 m; 150–220 °C.: 3°/min |
| detector: FID |
| carrier gas: hydrogen |

For the gas chromatographic analysis the fatty acids are reacted with boron trifluoride to the methyl esters.

Method of investigation 2.

(V. C. Tatam, C. C. Chongchit & C. K. Chow; Lipids 25 (1990) pp. 226–229;

H. Y. Wong et al.; Clin. Chem. 33 (1987) 214–220;

J. A. Knight et al.; Clin. Chem. 34 (1988) pp. 1197–12110)

Malondialdehyde determination

| Formation of malondialdehyde | |
|---|---|
| 0.1–0.5 ml | of the respective reaction sample |
| +0.5 ml | thiobarbituric acid reagent |
| | (2 parts 0.4% TBA in 0.2 N HCl + 1 part water) |
| +0.07 ml | 0.2% BHT in ethanol |

Thereafter 45 min in a water bath of 90° C. Thereafter extraction of the TBA-MDA adduct with isobutanol. The isobutanol extract is subsequently mixed with methanol (2:1) and injected into the HPLC.

| HPLC separation | |
|---|---|
| eluent: | methanol/water 1: 1 |
| 0.05 % tetrabutylammonium hydrogen sulphate | |
| column: | Lichrospher 100 RP-18 5 um |
| | 125 × 4 mm |
| detection: | fluorescence EX |
| | 515 nm Em: 550 nm |
| elution speed: | 1 ml/min |
| Standard plot made with 1,1,3,3 -tetrahydroxypropane. | |

The results illustrating the anti-oxidative efficacy of the inventive N-acylphosphatidylethanolamines are summarised in tables 1 to 7.

In comparison to the efficacy of the inventive compounds, investigations were performed with tocopherol (vitamin E). These data have been summarised as tables 8 to 11.

The values in the tables represent the absolute values, obtained with the respective method as well as the percent change, the value of the control sample without anti-oxidant being taken as 100%.

| Abbreviations used. | |
|---|---|
| 1. soybean N-acylphosphatidylethanolamine | NACPE |
| 2. soybean N-acetylphosphatidylethanolamine | NATPE |
| 3. soybean N-oleoylphosphatidylethanolamine | NOLPE |
| 4. cumene hydroperoxide | CHP |
| 5. UVA light irradiation | UVA |
| 6. lipoxygenase | LOG |
| 7. superoxide | SPO |
| 8. d,l-tocopherol | TOC |
| 9. gamma linoleic acid | GLA |
| 10. soybean phosphatidylcholine | SPC |
| 11. bovine brain phosphatidylethanolamine | HPE |
| 12. triglycerides from evening primrose | TRG |

TABLE 1

| NACPE concentration % by weight | substrate: oxidative agent method: absolute | GLA LOG 1 % |
|---|---|---|
| 0 | 2.9 | 100 |
| 0.01 | 0.7 | 24 |
| 0.05 | 0.8 | 28 |
| 0.1 | 0.6 | 21 |
| 0.5 | 0.6 | 21 |
| 1 | 0.7 | 24 |
| 5 | 0.8 | 28 |

TABLE 2

| NATPE concentration % by weight | substrate: oxidative agent: method: absolute | GLA UVA 1 % |
|---|---|---|
| 0 | 3.2 | 100 |
| 0.01 | 0.4 | 13 |
| 0.05 | 0.4 | 13 |
| 0.1 | 0.5 | 16 |
| 0.5 | 0,5 | 16 |
| 1 | 0.4 | 13 |
| 5 | 0.5 | 16 |

TABLE 3

| NOLPE concentration % by weight | substrate: oxidative agent: method: absolute | GLA CHP 2 % |
|---|---|---|
| 0 | 3.6 | 100 |
| 0.01 | 1.2 | 33 |
| 0.05 | 1.3 | 36 |
| 0.1 | 1.1 | 31 |
| 0.5 | 1,1 | 31 |
| 1 | 1.2 | 33 |
| 5 | 1.2 | 33 |

TABLE 4

| NATPE concentration % by weight | substrate: oxidative agent: method: absolute | SPC CHP 1 % |
|---|---|---|
| 0 | 2.4 | 100 |
| 0.01 | 1.0 | 41 |
| 0.05 | 0.9 | 38 |
| 0.1 | 0.8 | 33 |
| 0.5 | 0.7 | 29 |
| 1 | 0.8 | 33 |
| 5 | 0.8 | 33 |

TABLE 5

| NOLPE concentration % by weight | substrate: oxidative agent: method: absolute | HPE CHP 2 % |
|---|---|---|
| 0 | 2.0 | 100 |
| 0.01 | 0.8 | 40 |
| 0.05 | 0.8 | 40 |
| 0.1 | 0.8 | 40 |
| 0.5 | 0.8 | 40 |
| 1 | 0.9 | 45 |
| 5 | 0.9 | 45 |

TABLE 6

| NACPE concentration % by weight | substrate: oxidative agent: method: absolute | HPE CHP 2 % |
|---|---|---|
| 0 | 2.8 | 100 |
| 0.01 | 1.4 | 50 |
| 0.05 | 1.3 | 40 |
| 0.1 | 1.2 | 40 |
| 0.5 | 0.9 | 40 |
| 1 | 1.3 | 45 |

TABLE 6-continued

| NACPE concentration % by weight | substrate: oxidative agent: method: absolute | HPE CHP 2 % |
|---|---|---|
| 5 | 1.6 | 45 |

TABLE 7

| NATPE concentration % by weight | substrate: oxidative agent: method: absolute | HPE CHP 2 % |
|---|---|---|
| 0 | 2.4 | 100 |
| 0.01 | 1.9 | 79 |
| 0.05 | 1.7 | 71 |
| 0.1 | 1.2 | 50 |
| 0.5 | 1.3 | 54 |
| 1 | 1.4 | 58 |
| 5 | 1.8 | 75 |

The following determinations were comparative investigations performed with α-tocopherol.

TABLE 8

| TOC concentration % by weight | substrate: oxidative agent: method: absolute | GLA CHP 2 % |
|---|---|---|
| 0 | 3.6 | 100 |
| 0.01 | 1.0 | 28 |
| 0.05 | 0.8 | 22 |
| 0.1 | 0.6 | 17 |
| 0.5 | 0.7 | 19 |
| 1 | 0.7 | 19 |
| 5 | 0.7 | 19 |

TABLE 9

| TOC concentration % by weight | substrate: oxidative agent: method: absolute | GLA LOG 1 % |
|---|---|---|
| 0 | 2.9 | 100 |
| 0.01 | 0.6 | 21 |
| 0.05 | 0.6 | 21 |
| 0.1 | 0.5 | 17 |
| 0.5 | 0.5 | 17 |
| 1 | 0.7 | 24 |
| 5 | 0.6 | 21 |

TABLE 10

| NACPE concentration % by weight | substrate: oxidative agent: method: absolute | HPE CHP 1 % |
|---|---|---|
| 0 | 2.4 | 100 |
| 0.01 | 0.8 | 33 |
| 0.05 | 0.7 | 30 |
| 0.1 | 0.7 | 30 |
| 0.5 | 0.7 | 30 |
| 1 | 0.8 | 33 |
| 5 | 0.7 | 30 |

TABLE 11

| TOC concentration % by weight | substrate: oxidative agent: method: absolute | TRG CHP 2 % |
|---|---|---|
| 0 | 2.4 | 100 |
| 0.01 | 1.3 | 54 |
| 0.05 | 1.0 | 42 |
| 0.1 | 1.0 | 42 |
| 0.5 | 0.7 | 29 |
| 1 | 0.8 | 33 |
| 5 | 0.8 | 33 |

I claim:

1. A method of inhibiting oxidation of products containing unsaturated fatty acids and their derivatives, comprising treating said unsaturated fatty acids and their derivatives with an N-acylphosphatidylethanolamine having an acyl group bound to an amino group, wherein said acyl group bound to said amino group is selected from the group consisting of an acetyl group, an oleoyl group, and mixtures of saturated or unsaturated fatty acid groups with 14 to 18 carbon atom.

2. The method of claim 1, wherein said N-acylphosphatidylethanolamine comprises 0.01 to 5% by weight relative to the weight of said products.

3. The method of claim 1, wherein said N-acylphosphatidylethanolamine is a natural fatty acid moiety or a mixture of natural fatty acid moieties.

4. The method of claim 1, wherein said N-acylphosphatidylethanolamine is N-acetylphosphatidylethanolamine.

5. The method of claim 1, wherein said N-acylphosphatidylethanolamine is N-oleoylphosphatidylethanolamine.

6. The method of claim 1, wherein said products are present in an aqueous phase.

7. The method of claim 1 wherein said products are present in an oil phase.

8. The method of claim 1 wherein said products comprise free fatty acids.

9. The method of claim 1 wherein said products comprise phospholipids.

10. The method of claim 1 wherein said products comprise fatty acid triglycerides.

* * * * *